US009880277B2

(12) United States Patent
Knight et al.

(10) Patent No.: US 9,880,277 B2
(45) Date of Patent: Jan. 30, 2018

(54) SYNTHETIC APERTURE RADAR PROCESSING

(71) Applicants: Chad P. Knight, Hyde Park, UT (US); Jacob H. Gunther, North Logan, UT (US)

(72) Inventors: Chad P. Knight, Hyde Park, UT (US); Jacob H. Gunther, North Logan, UT (US)

(73) Assignee: Utah State University Research Foundation, Logan, UT (US)

( * ) Notice: Subject to any disclaimer, the term of this patent is extended or adjusted under 35 U.S.C. 154(b) by 377 days.

(21) Appl. No.: 14/702,272

(22) Filed: May 1, 2015

(65) Prior Publication Data

US 2015/0316647 A1 Nov. 5, 2015

Related U.S. Application Data

(60) Provisional application No. 61/987,042, filed on May 1, 2014.

(51) Int. Cl.
*G01S 13/90* (2006.01)
*G01S 7/02* (2006.01)
*G01S 7/35* (2006.01)

(52) U.S. Cl.
CPC .............. *G01S 13/90* (2013.01); *G01S 7/023* (2013.01); *G01S 13/9035* (2013.01); *G01S 2007/358* (2013.01); *G01S 2013/9052* (2013.01)

(58) Field of Classification Search
CPC .............................. G01S 13/90; G01S 13/9035
USPC .................................................. 342/25 R–5 F
See application file for complete search history.

(56) References Cited

U.S. PATENT DOCUMENTS

| | | | | |
|---|---|---|---|---|
| 4,967,200 A | * | 10/1990 | Arambepola | G01S 13/9011 342/189 |
| 5,546,084 A | * | 8/1996 | Hindman | G01S 7/411 342/161 |
| 7,245,250 B1 | * | 7/2007 | Kalayeh | G01S 13/9011 342/189 |
| 9,363,024 B2 | * | 6/2016 | Nguyen | H04B 15/00 |
| 2008/0297405 A1 | * | 12/2008 | Morrison, Jr. | G01S 13/90 342/25 F |
| 2011/0163912 A1 | * | 7/2011 | Ranney | G01S 7/414 342/25 F |
| 2015/0134712 A1 | * | 5/2015 | Yamada | G01R 33/56545 708/200 |

OTHER PUBLICATIONS

Knight, Chad P., Convex Model-Based Synthetic Aperture Radar Processing, Dissertation, 2014.
Gorham, Leroy A. and Moore, Linda J., SAR Image Formation Toolbox for MATLAB, SPIE, Apr. 19, 2010, vol. 7699.
(Continued)

*Primary Examiner* — Marcus E Windrich

(57) ABSTRACT

For synthetic aperture radar (SAR) processing, a SAR receives a plurality of SAR signals. The SAR generates a piecewise approximation of the plurality of SAR signals over a coherent processing interval. The piecewise approximation may mitigate phase reflection components of each SAR signal. The SAR further generates an estimate of the scene from the piecewise approximation.

17 Claims, 9 Drawing Sheets

(56) References Cited

OTHER PUBLICATIONS

Yegulalp, Ali F., Fast Backprojection Algorithm for Synthetic Aperture Radar, Radar Conference, 1999, The Record of the 1999 IEEE.
Ulander, Lars M.H. et al., Fast Factorized Back-Projection for Bistatic SAR Processing, Synthetic Aperture Radar (EUSAR), 2010 8th European Conference, Jun. 2010.
Potter, Lee C. et al., A GTD-Based Parametric Model for Radar Scattering, IEEE Transactions on Antennas and Propagation, Oct. 1995, vol. 43, No. 10.
Cetin, Mujdat and Karl, William C., Feature-Enhance Synthetic Aperture Radar Image Formation Based on Nonquadratic Regularization, IEEE Transactions on Image Processing, Apr. 2001, vol. 10, No. 4.
Stojanovic, Ivana et al., Joint Space Aspect Reconstruction of Wide-Angle SAR Exploiting Sparsity, 2008.
Potter, Lee C. et al., Sparsity and Compressed Sensing in Radar Imaging, Proceedings of the IEEE, 2010, vol. 98, No. 6.
Cetin, Mujdat and Moses, Randolph L., SAR Imaging from Partial-Aperture Data with Frequency-Band Omissions, 2005.
Malioutov, Dmitry et al., A Sparse Signal Reconstruction Perspective for Source Localization with Sensor Arrays, IEEE Transactions on Signal Processing, Aug. 2005, vol. 53, No. 8.
Lathi, B.P., Signal Processing and Linear Systems (Superposition), 1998, pp. 79-82, Berkeley Cambridge Press, Carmichael, CA.
Lathi, B.P., Signal Processing and Linear Systems (Hann Window), 1998, pp. 304-305, Berkeley Cambridge Press, Carmichael, CA.

* cited by examiner

SYNTHETIC APERTURE RADAR PROCESSING

CROSS-REFERENCE TO RELATED APPLICATIONS

This application claims priority to U.S. Provisional Patent Application No. 61/987,042 entitled "SYNTHETIC APERTURE RADAR PROCESSING" and filed on May 1, 2014 for Chad P. Knight, which is incorporated herein by reference.

BACKGROUND

Field

The subject matter disclosed herein relates to synthetic aperture radar (SAR) and more particularly relates to SAR processing.

Description of the Related Art

SAR can provide finer resolution than conventional radar, but is also processing intensive.

BRIEF SUMMARY

A method for SAR processing is disclosed. A SAR receives a plurality of SAR signals. The SAR generates a piecewise approximation of the plurality of SAR signals over a coherent processing interval. The piecewise approximation may mitigate phase reflection components of each SAR signal. The SAR further generates an estimate of the scene from the piecewise approximation.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION OF THE INVENTION

Figure 1A:
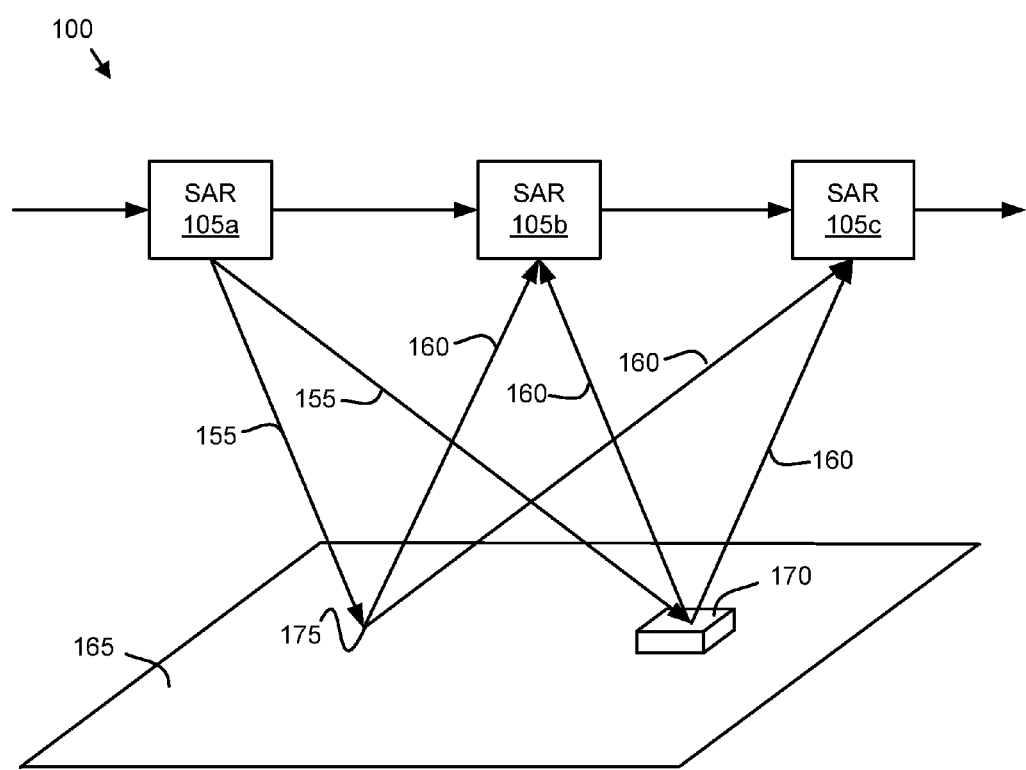
FIG. 1A is a drawing illustrating one embodiment of a synthetic aperture radar (SAR) scan.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages, including an object oriented programming language such as Python, Ruby, Java, Smalltalk, C++ or the like and conventional procedural programming languages, such as the "C" programming language or similar programming languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

Knight, Chad P., "Convex Model-Based Aperture Radar Processing" is incorporated herein by reference. The description of elements in each figure may refer to elements of proceeding figures. Like numbers refer to like elements in all figures, including alternate embodiments of like elements.

FIG. 1A is a drawing illustrating one embodiment of a SAR scan 100. In the depicted embodiment, the SAR 105 is moving relative to a scene 165. The SAR 105 may be mounted on an airplane. The SAR 105 may periodically illuminate the scene 165 with electromagnetic pulses 155. The electromagnetic pulses 155 may reflect from targets 170, 175 in the scene 165 and be received as SAR signals 160 by the SAR 105 at a subsequent position such as SAR 105b and/or SAR 105c. In addition, different portions of the electromagnetic pulse 155 may be received by the SAR 105 at different positions, such as SAR 105b and SAR 105c. The difference positions of the SAR 105 may form a plurality of synthetic apertures.

Figure 1B:
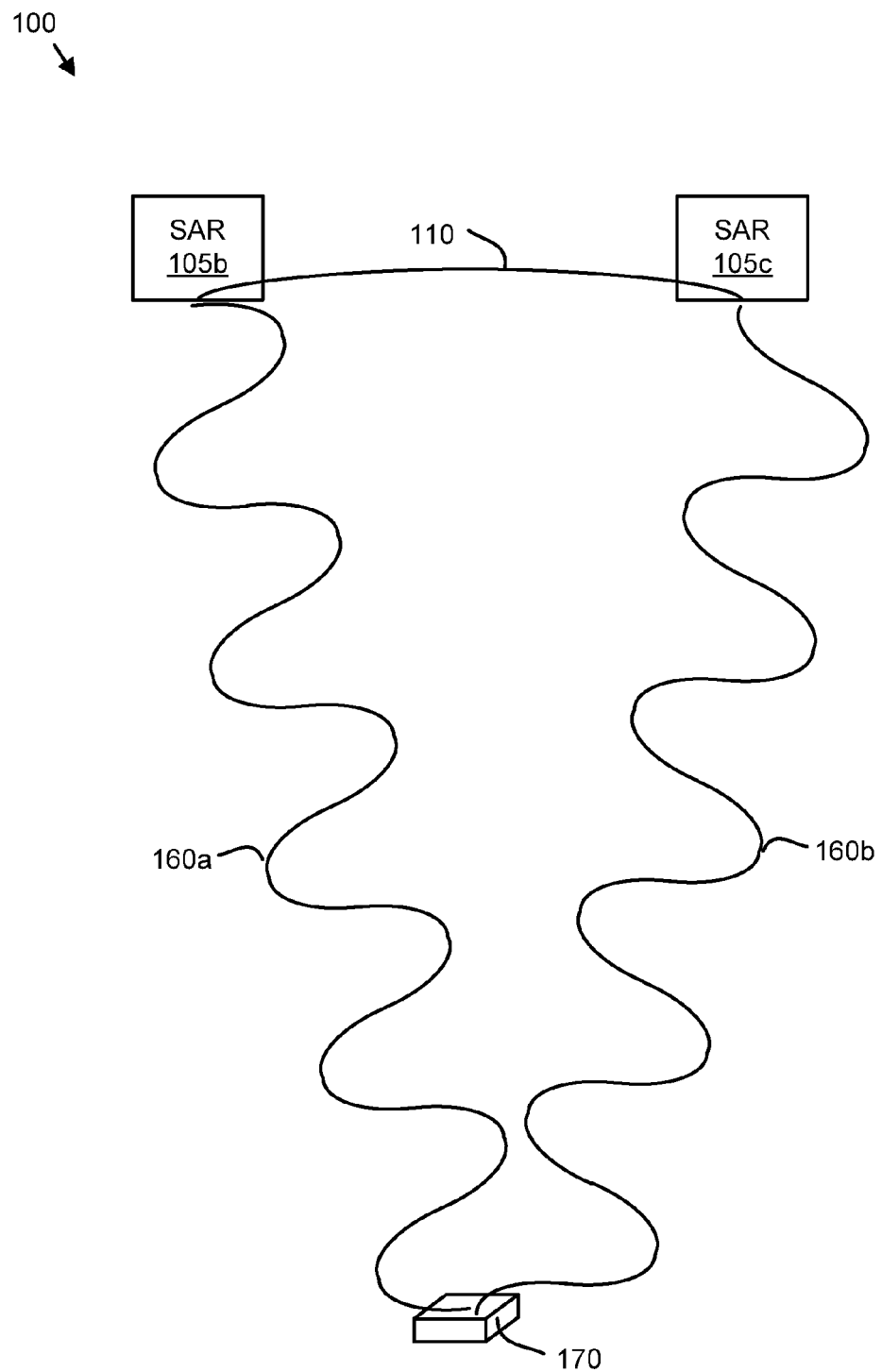
FIG. 1B is a drawing illustrating one alternative embodiment of a SAR scan.

FIG. 1B is a drawing illustrating one alternative embodiment of a SAR scan 100. The SAR signals 160 from the target 170 are received by the SAR 105 at two positions over a coherent processing interval 110. The first SAR signals 160a is at a trough when received by the SAR 105b while the second SAR signals 160b is at a peak when received by the SAR 105c. The difference in the phase of the SAR signals 160 results in a phase reflection component for each source signal 160. Destructive interference between the phase reflection components reduces the overall magnitude of the reflected magnetic pulse 160.

In the past, the phase reflection component of the SAR signals 160 has reduced the detail that can be parsed from the SAR signals 160. The embodiments described herein may generate a piecewise approximation of the plurality of SAR signals 160 over the coherent processing interval 110. The piecewise approximation may mitigate the phase reflection components of each of the SAR signals 160. As a result, the embodiments better approximate the magnitude of the SAR signals 160 over the coherent processing interval 110 and generate a higher resolution estimate of the scene 165 as will be described hereafter.

Figure 2A:
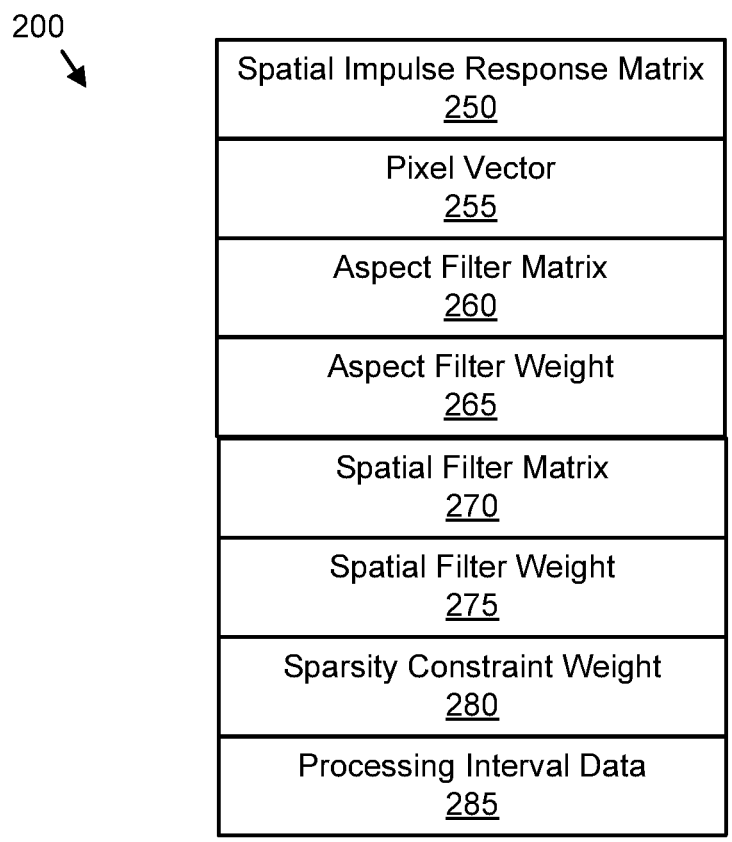
FIG. 2A is a schematic block diagram illustrating one embodiment of SAR data.

FIG. 2A is a schematic block diagram illustrating one embodiment of SAR data 200. The SAR data 200 may be organized as one or more data structures and stored in a memory. In the depicted embodiment, the SAR data 200 includes a spatial impulse response matrix 250, a pixel vector 255, an aspect filter matrix 260, an aspect filter weight 265, a spatial filter matrix 270, a spatial filter weight 275, a sparsity constraint weight 280, and processing interval data 285.

The spatial impulse response matrix A 250 may store a plurality of SAR signals 160 for a plurality of synthetic apertures of a specified trajectory of the SAR 105. The specified trajectory may be a flight geometry for an airborne SAR 105. The SAR signals 160 may be stored from multiple positions of the SAR 105 over the specified trajectory.

The pixel vector x 255 may be a vector to a pixel of the scene 165. The product of the spatial impulse response matrix A 205 and the pixel vector x 255 may be a SAR image b as shown in Equation 1.

$$Ax = b \qquad \text{Equation 1}$$

Figure 5A:
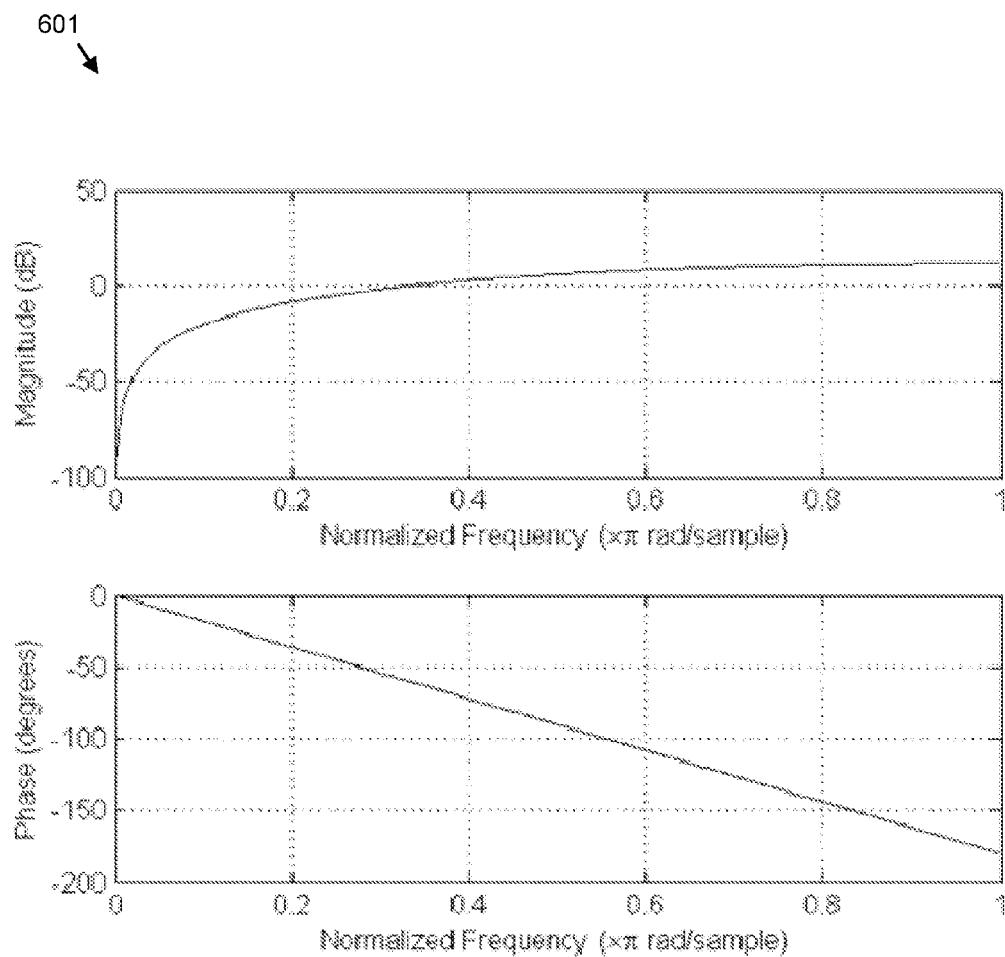
FIG. 5A is a graph illustrating one embodiment of a frequency response for the aspect filter.
Figure 5B:
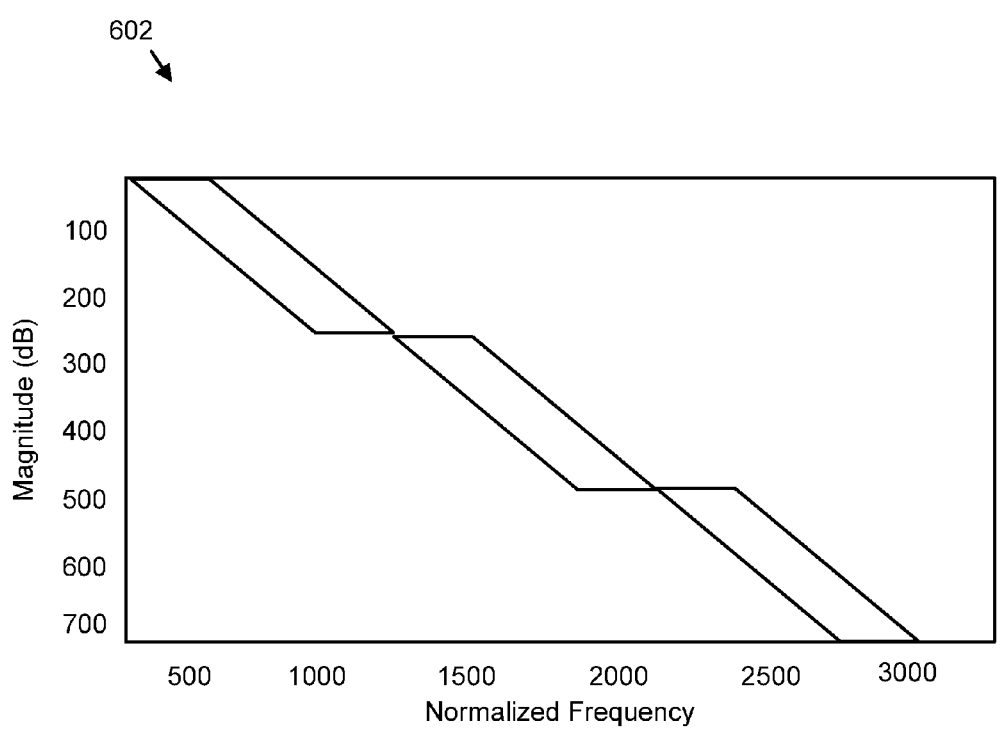
FIG. 5B is a graph illustrating one embodiment of an aspect filter response.

The aspect filter matrix F 260 may filter the magnitude of the SAR signals 160. One embodiment of the frequency response for the aspect filter F 260 is shown in FIG. 5A. In one embodiment, the aspect filter F 260 comprises a plurality of structures comprising diagonal components. The diagonal components may be dependent on a number of tap coefficients, also referred to as Fourier series coefficients, used to filter the SAR signals 160. For example, if N taps are used in an aspect filter then the aspect filter matrix F 260 may have N−1 diagonal components. Each diagonal component may represent a pixel for a separate synthetic aperture of the SAR 105. The aspect filter weight $w_f$ 265 may specify a weight for modifying an output of an aspect filter as will be described hereafter. One embodiment of the frequency response for the aspect filter 260 for three synthetic apertures is shown in FIG. 5B.

Figure 5C:
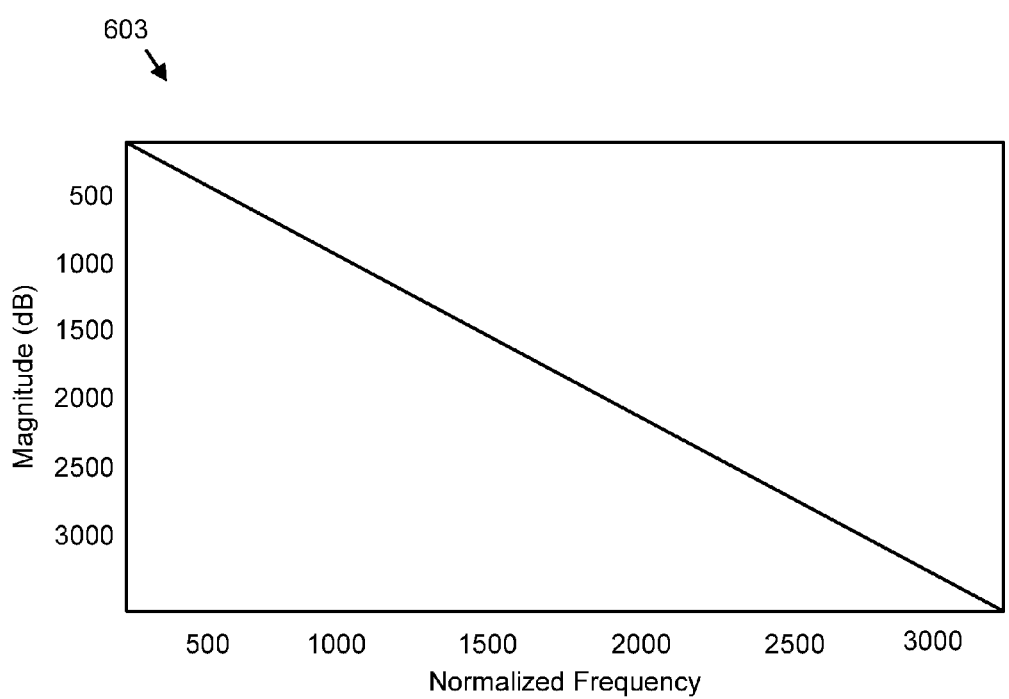
FIG. 5C is a graph illustrating one embodiment of a spatial filter response.

The spatial filter G 270 may filter a specified virtual aperture of the SAR signals 160. As a result, the spatial filter G 270 may be a time-domain representation of a diagonal filter. The frequency response of the spatial filter G 270 is shown in FIG. 5C. The response of the spatial filter G 270 may be two dimensional for a plane and three dimensional for a cube. The spatial filter weight $w_g$ 275 may modify an output of a spatial filter as will be described hereafter.

The sparsity constraint weight $w_m$ 280 may modify output of a sparsity constraint as will be described hereafter. The processing interval data 285 may describe the coherent processing interval 110.

Figure 2B:
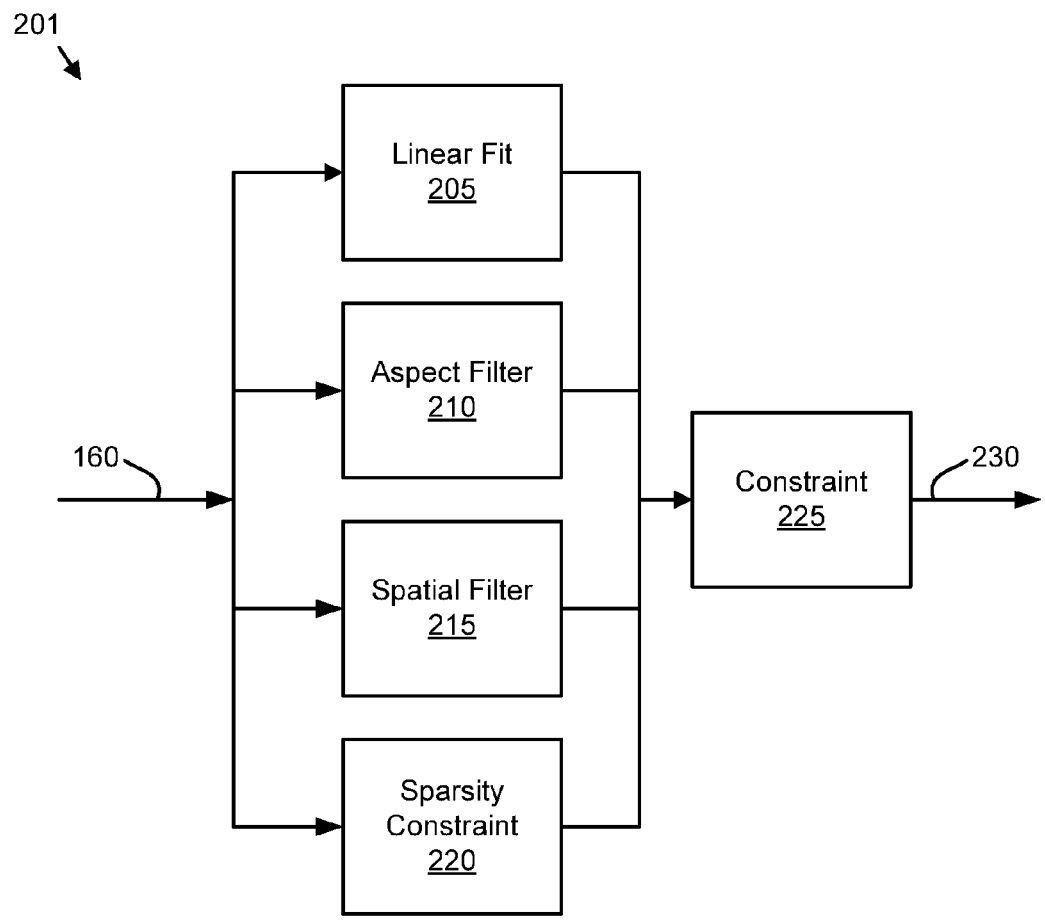
FIG. 2B is a schematic block diagram illustrating one embodiment of a SAR processing flow.

FIG. 2B is a schematic block diagram illustrating one embodiment of a SAR signal processing flow 201. The processing flow 201 may be performed by semiconductor arithmetic units, one or more computers, or combinations thereof. In the depicted embodiment, the SAR signals 160 are received. In one embodiment, a computer receives the SAR signals 160. The SAR signals 160 may be received at a plurality of positions of the SAR 105 and/or at a plurality of wavelengths. Each position receiving SAR signals 160 may be considered a synthetic aperture of the SAR 105.

The SAR signals 160 may be processed using a linear fit 205. The linear fit 205 may be the function of the Equation 2, where A is the spatial impulse response matrix 250 for a plurality of synthetic apertures and x is the pixel vector 255.

$$\|Ax - b\|_2 \qquad \text{Equation 2}$$

The SAR signals 160 may be further concurrently processed using an aspect filter 210. The aspect filter 210 may filter a change between the synthetic apertures. For example, the aspect filter 210 may modify the change from a first pixel from a first point of view of a first image to the first pixel at a second point of view of a second image, accentuating some responses of the change while suppressing other responses to the change. The aspect filter 210 may be the function of the Equation 3, where F is the aspect filter matrix 260, $w_f$ is the aspect filter weight 265, and $x_m$ is an absolute value of a complex form of the pixel vector 255. One embodiment of a response of the aspect filter 210 is shown in FIG. 5B.

$$w_f \|F x_m\|_p \qquad \text{Equation 3}$$

The SAR signals 160 may also be concurrently processed by a sparsity constraint 220. The sparsity constraint 220 may be the function of Equation 4, where $w_m$ is the sparsity constraint weight 280.

$$w_m \|x_m\|_q \qquad \text{Equation 4}$$

The sparsity constraint 220 may penalize solutions with large magnitudes, encouraging $x_m$ to be as small as possible by concentrating results using a minimal basis representation, such as a minimal number of pixels.

The SAR signals 160 may be further concurrently processed by a spatial filter 215. The spatial filter 215 may filter a first pixel of a first point of view of a first image as a function of other surrounding pixels of the first point of view. The surrounding pixels may be organized as a two dimensional structure or a three dimensional structure. The spatial filter 215 may be the function of Equation 5, where G is the spatial filter matrix 270 and $w_g$ is the spatial filter weight 275. One embodiment of a response of the spatial filter 215 is shown in FIG. 5C.

$$w_g \|G x_m\|_f \qquad \text{Equation 5}$$

The SAR processing flow 201 may generate a piecewise approximation 230 of the plurality of SAR signals 160 as a function of the linear fit 205, the aspect filter 210, the spatial filter 215, and the sparsity constraint 220. The aspect filter weight 265, the spatial filter weight 275, and the sparsity constraint weight 280 may modify the relative contributions of the linear fit 205, the aspect filter 210, the spatial filter 215, and the sparsity constraint 220 The linear fit 205, the aspect filter 210, the spatial filter 215, and the sparsity constraint 220 may be subject to a constraint 225.

In one embodiment, the piecewise approximation 230 is subject to the constraint 225 of Equation 6, for all pixel coordinates k and l.

$$\sqrt{(x_{k,l}^r)+(x_{k,l}^i)^2} \le x_{m_{k,l}} \qquad \text{Equation 6}$$

In one embodiment, the piecewise approximation 230 of the SAR signals 160 is calculated by minimizing Equation 7 subject to Equation 6. The constraint of Equation 6 may provide a spatial smoothness term to smooth the piecewise approximation 230.

$$\min (\|Ax-b\|_2 + w_f\|Fx_m\|_p + w_m\|x_m\|_q + w_g\|Gx_m\|_f) \qquad \text{Equation 7}$$

In one embodiment, the linear fit 205 minimizes Equation 8, subject to Equation 1, where $c^T$ is defined by Equation 9 where d is a constant.

$$c^T x \qquad \text{Equation 8}$$

$$\|Ax_i - b\|_2 \le c^T + d \qquad \text{Equation 9}$$

Minimizing Equation 8 may transform the solution to Equation 6 in Equation 7 into a convex problem such as may be solved with a standard second-order cone program.

The piecewise approximation 230 of the SAR signals 160 mitigates the phase reflection components of the SAR signals 160. As a result, the piecewise approximation 230 provides a more accurate representation of the magnitude of the SAR signals 160. Target features of interest may be accentuated while non-ideal target features may be suppressed to improve the utility of a SAR image.

Figure 3:
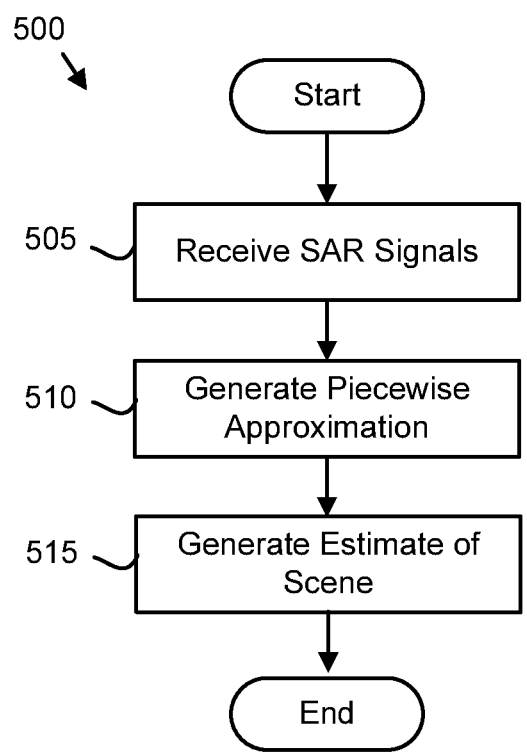
FIG. 3 is a schematic flow chart diagram illustrating one embodiment of a SAR signal processing method.

FIG. 3 is a schematic flow chart diagram illustrating one embodiment of a SAR processing method 500. The method 500 may be performed by semiconductor arithmetic units. Alternatively, the method 500 may be performed by a processor. In one embodiment, the method 500 is performed by computer readable storage medium such as the memory that stores program code that is executable by the processor.

The method 500 starts, and in one embodiment, the SAR 105 receives 505 a plurality of SAR signals 160. The SAR signals 160 may be received at a plurality of locations, effectively forming a plurality of synthetic apertures.

The SAR 105 may further generate 510 the piecewise approximation 230 of the plurality of SAR signals 160 as a function of the linear fit 205, the aspect filter 210, the spatial filter 215, and the sparsity constraint 220 over the coherent processing interval 110. In one embodiment, the piecewise approximation 230 of the plurality of SAR signals 160 is calculated by minimizing Equation 7 subject to Equation 6. The piecewise approximation 230 may mitigate the phase reflection components of the SAR signals 160. As a result, the piecewise approximation 230 of the plurality of SAR signals 160 provides a more accurate representation of the magnitude of the SAR signals 160. Target features of interest may be accentuated while non-ideal target features may be suppressed to improve the utility of a SAR image.

The SAR 105 may generate 515 an estimate of the scene 165 from the piecewise approximation 230, and the method 500 ends.

Figure 4:
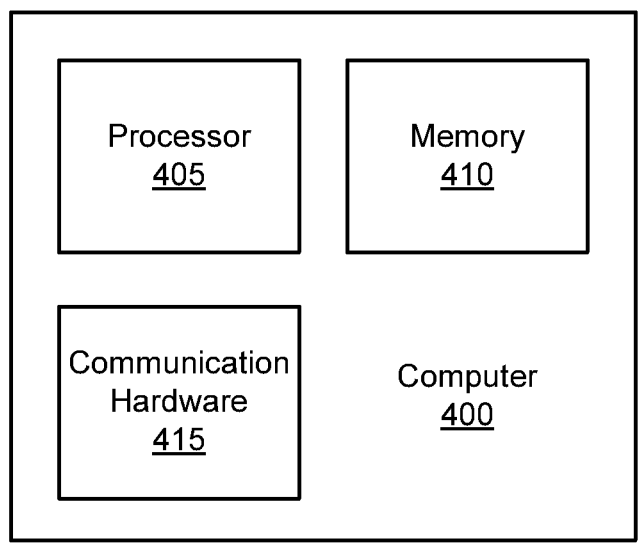
FIG. 4 is a schematic block diagram illustrating one embodiment of a computer.

FIG. 4 is a schematic block diagram illustrating one embodiment of a computer 400. In the depicted embodiment, the computer 400 includes a processor 405, a memory 410, and communication hardware 415. The memory 410 may be a computer readable storage medium such as a semiconductor storage device, a hard disk drive, a holographic storage device, a micromechanical storage device, or the like. The memory 410 may store program code. The processor 405 may execute the program code. The communication hardware 415 may communicate with other devices.

FIG. 5A are graphs 601 illustrating one embodiment of a frequency response for the aspect filter matrix 260. The graphs 601 show the magnitude and the phase of the aspect filter 260 as a function of a normalized frequency.

FIG. 5B is a graph 602 illustrating one embodiment of an aspect filter response. The graph 602 shows a magnitude of the response of the aspect filter 260 for a normalized frequency. The depicted embodiment may show the aspect filter response for three synthetic apertures.

FIG. 5C is a graph 603 illustrating one embodiment of a spatial filter response. The graph 603 shows a magnitude of the response of the spatial filter 270 for a normalized frequency.

The embodiments generate the piecewise approximation 230 of the SAR signals 130 as a function of the linear fit 205, the aspect filter 210, the spatial filter 215, and the sparsity constraint 220, reducing the phase reflection components of the SAR signals 160 and providing a more accurate representation of the magnitude of the SAR signals 160.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for synthetic aperture radar (SAR) processing comprising:

receiving, by use of a processor, a plurality of SAR signals;

generating a piecewise approximation of the plurality of SAR signals over a coherent processing interval, wherein the piecewise approximation is a function of a linear fit, an aspect filter, a spatial filter, and a sparsity constraint and mitigates phase reflection components of each SAR signal; and generating an estimate of a scene from the piecewise approximation.

2. The method of claim 1, wherein the aspect filter calculates $w_f\|Fx_m\|_p$, wherein F is an aspect filter matrix, $x_m$ is an absolute pixel vector, $Fx_m$ are normalized to a given unit p, and $w_f$ is an aspect filter weight.

3. The method of claim 1, wherein the spatial filter calculates $w_g\|Gx_m\|_f$, wherein G is a spatial filter matrix, $x_m$ is an absolute pixel vector, $Gx_m$ are normalized to a given unit f, and $w_g$ is a spatial filter weight.

4. The method of claim 1, wherein the sparsity constraint calculates $w_m\|x_m\|q$, wherein $x_m$ is an absolute pixel vector normalized to a given unit q, and $w_m$ is a sparsity weight.

5. The method of claim 1, wherein the piecewise approximation of the plurality of SAR signals is calculated by minimizing $\|Ax-b\|_2 + w_f\|Fx_m\|_p + w_m\|x_m\|_q + w_g\|Gx_m\|_f$ subject to $\sqrt{(x_{k,l}^r)+(x_{k,l}^i)^2} \le x_{m_{k,l}}$ for all pixel coordinates k, l, where $x_m$ is an absolute pixel vector, $Fx_m$ is the aspect filter, $Gx_m$ is the spatial filter, and $w_m$ is the sparsity constraint.

6. The method of claim 1, wherein A is a spatial impulse response matrix, x is a pixel vector and $c^T$ is a transpose of a constraint cone defined by $\|Ax_i-b\|_2 \le c^T + d$ where d is a constant and the piecewise approximation of the plurality of SAR signals is calculated by minimizing $c^T x$ subject to Ax=b.

7. A program product comprising a computer readable storage medium that stores code executable by a processor, the executable code comprising code to perform:

receiving a plurality of SAR signals;

generating a piecewise approximation of the plurality of SAR signals over a coherent processing interval, wherein the piecewise approximation is a function of a linear fit, an aspect filter, a spatial filter, and a sparsity constraint and phase reflection components of each SAR signal; and generating an estimate of a scene from the piecewise approximation.

8. The program product of claim 7, wherein the aspect filter calculates $w_f\|Fx_m\|_p$, wherein F is an aspect filter matrix, $x_m$ is an absolute pixel vector, $Fx_m$ are normalized to a given unit p, and $w_f$ is an aspect filter weight.

9. The program product of claim 7, wherein the spatial filter calculates $w_g\|Gx_m\|_f$, wherein G is a spatial filter matrix, $x_m$ is an absolute pixel vector, $Gx_m$ are normalized to a given unit f, and $w_g$ is a spatial filter weight.

10. The program product of claim 7, wherein the sparsity constraint calculates $w_m\|x_m\|_q$, wherein $x_m$ is an absolute pixel vector normalized to a given unit q, and $w_m$ is a sparsity weight.

11. The program product of claim 7, wherein the piecewise approximation of the plurality of SAR signals is calculated by minimizing $\|Ax-b\|_2+w_f\|Fx_m\|_p+w_m\|x_m\|_q+w_g\|Gx_m\|_f$ subject to $\sqrt{(x_{k,l}^r)+(x_{k,l}^i)^2} \leq x_{m_{k,l}}$ for all pixel coordinates k, l, where $x_m$ is an absolute pixel vector, $Fx_m$ is the aspect filter, $Gx_m$ is the spatial filter, and $w_m$ is the sparsity constraint.

12. The program product of claim 7, wherein A is a spatial impulse response matrix, x is a pixel vector and $c^T$ is a transpose of a constraint cone defined by $\|Ax_i-b\|_2 \leq c^T+d$ where d is a constant and the piecewise approximation of the plurality of SAR signals is calculated by minimizing $c^Tx$ subject to Ax=b.

13. An apparatus comprising:
a processor;
a memory that stores code executable by the processor, the code comprising:
code that receives a plurality of SAR signals;
code that generates a piecewise approximation of the plurality of SAR signals over a coherent processing interval, wherein the piecewise approximation is a function of a linear fit, an aspect filter, a spatial filter, and a sparsity constraint and mitigates phase reflection components of each SAR signal; and
code that generates an estimate of a scene from the piecewise approximation.

14. The apparatus of claim 13, wherein the aspect filter calculates $w_f\|Fx_m\|_p$, wherein F is an aspect filter matrix, $x_m$ is an absolute pixel vector, $Fx_m$ are normalized to a given unit p, and $w_f$ is an aspect filter weight.

15. The apparatus of claim 13, wherein the spatial filter calculates $w_g\|Gx_m\|_f$, wherein G is a spatial filter matrix, $x_m$ is an absolute pixel vector, $Gx_m$ are normalized to a given unit f, and $w_g$ is a spatial filter weight.

16. The apparatus of claim 13, wherein the sparsity constraint calculates $w_m\|x_m\|_q$, wherein $x_m$ is an absolute pixel vector normalized to a given unit q, and $w_m$ is a sparsity weight.

17. The apparatus of claim 13, wherein the piecewise approximation of the plurality of SAR signals is calculated by minimizing $\|Ax-b\|_2+w_f\|Fx_m\|_p+w_m\|x_m\|_q+w_g\|Gx_m\|_f$ subject to $\sqrt{(x_{k,l}^r)+(x_{k,l}^i)^2} \leq x_{m_{k,l}}$ for all pixel coordinates k, l, where $x_m$ is an absolute pixel vector, $Fx_m$ is the aspect filter, $Gx_m$ is the spatial filter, and $w_m$ is the sparsity constraint.

* * * * *